Sept. 4, 1962 J. ZIMARIK 3,052,113
APPARATUS FOR WASHING AND WATER-EXTRACTING CLOTHES
Filed July 1, 1958 8 Sheets-Sheet 1

INVENTOR.
JOHN ZIMARIK
BY William Cleland
ATTORNEY

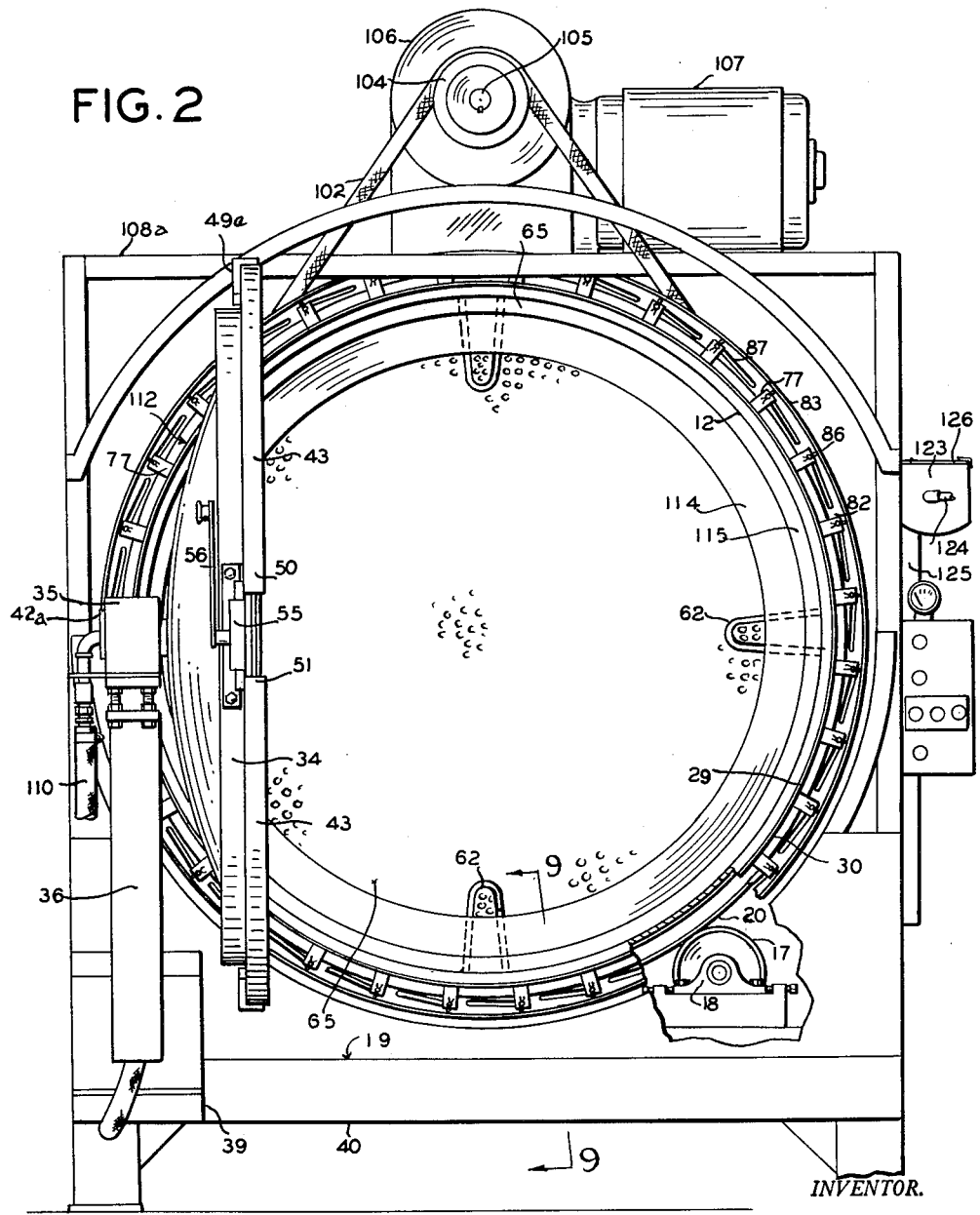

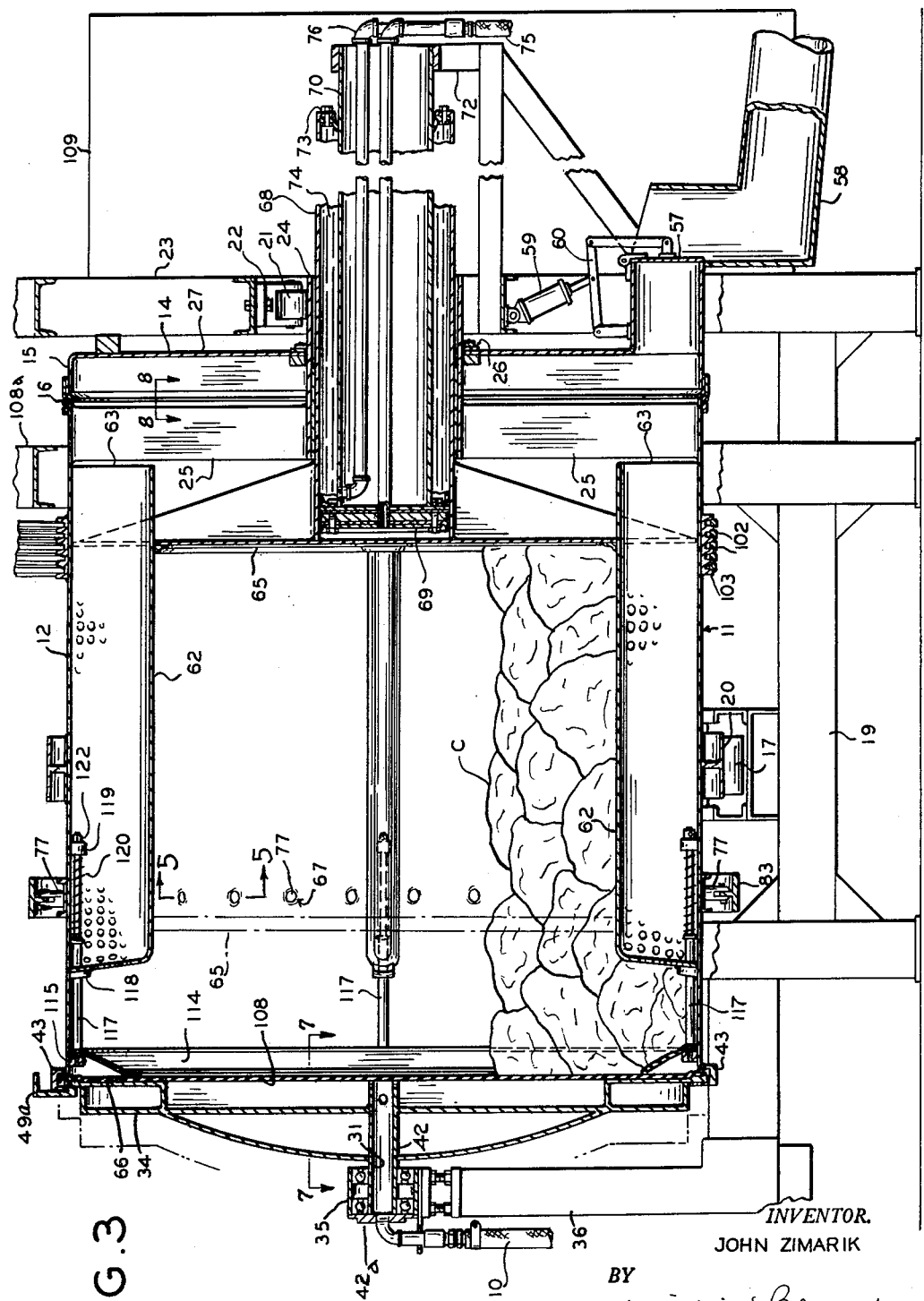

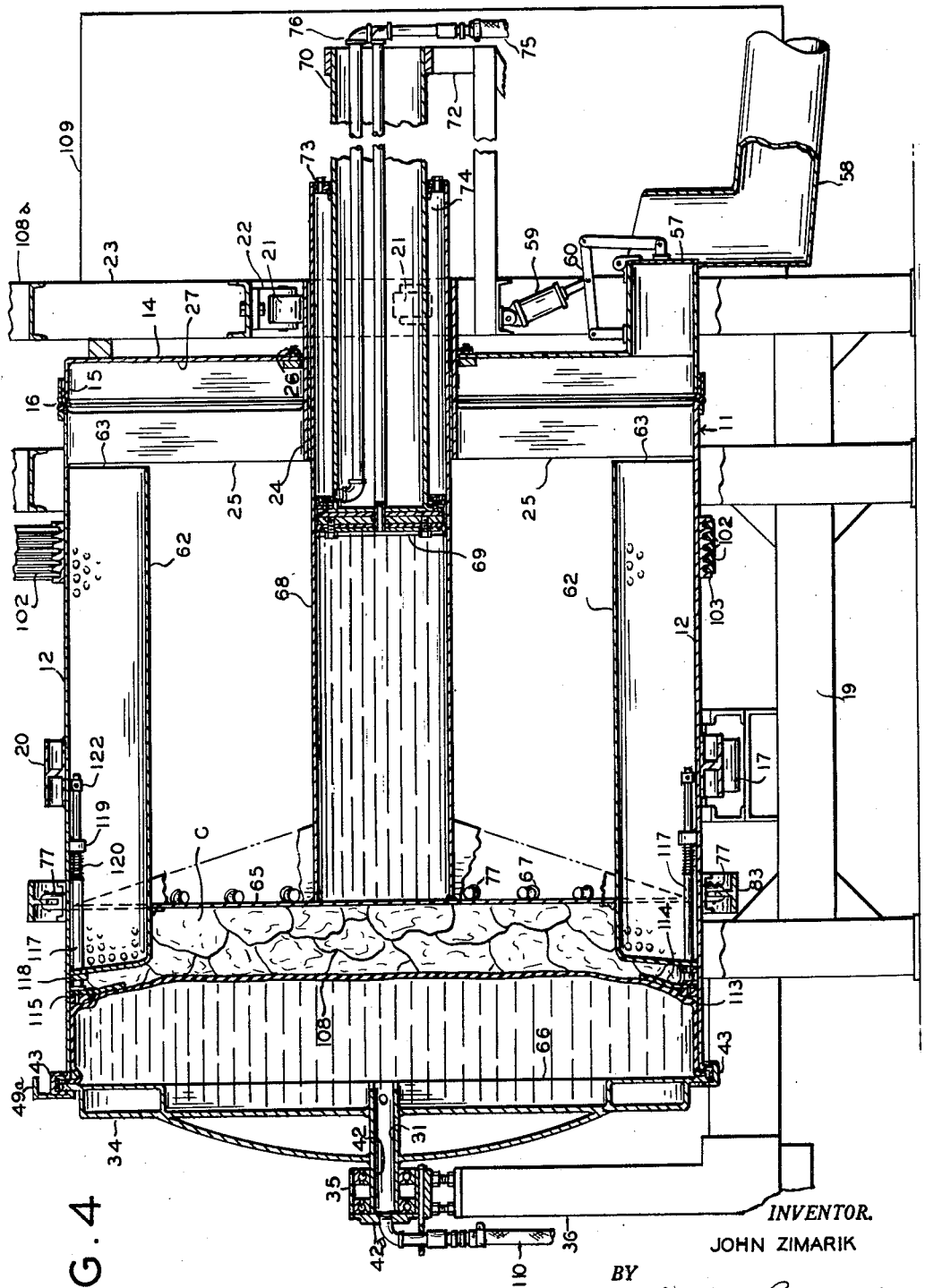

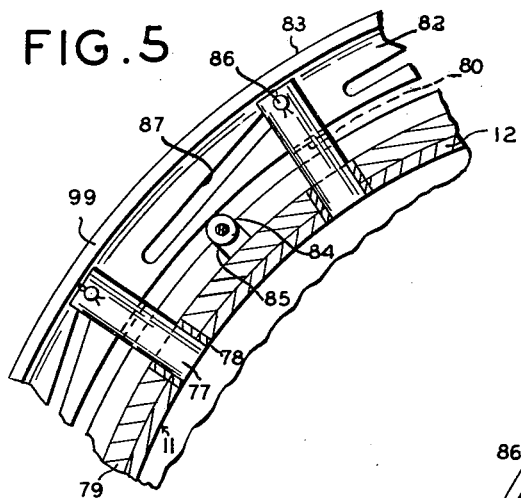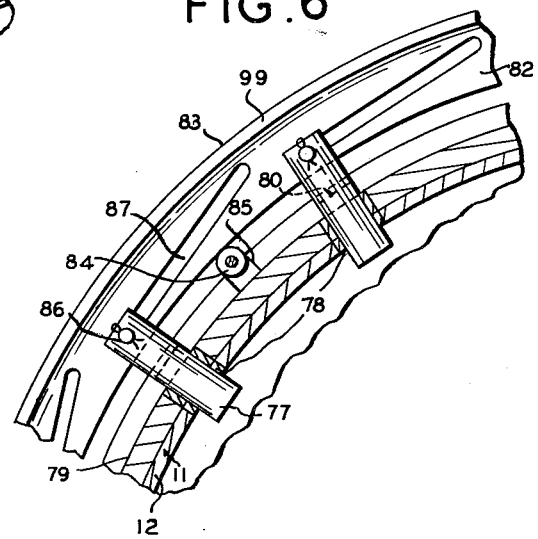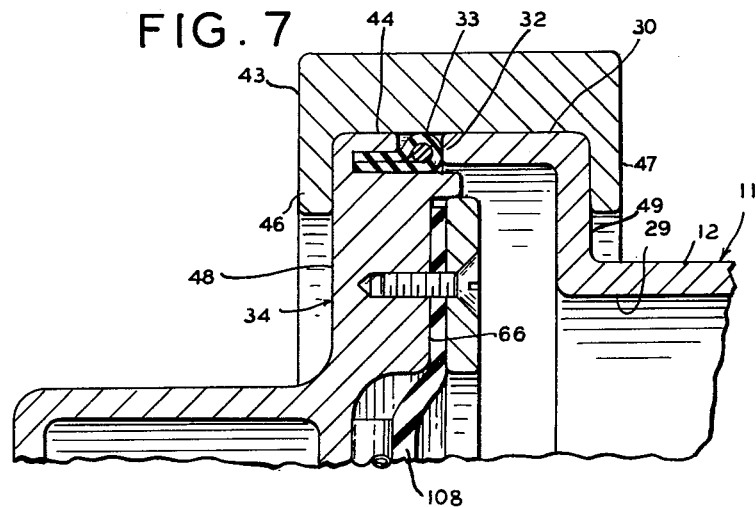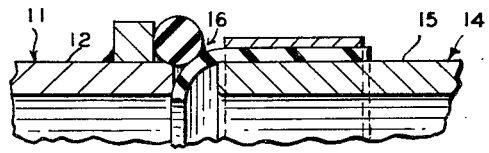

Sept. 4, 1962  J. ZIMARIK  3,052,113
APPARATUS FOR WASHING AND WATER-EXTRACTING CLOTHES
Filed July 1, 1958  8 Sheets-Sheet 6

INVENTOR.
JOHN ZIMARIK
BY William Cleland
ATTORNEY

Sept. 4, 1962 J. ZIMARIK 3,052,113
APPARATUS FOR WASHING AND WATER-EXTRACTING CLOTHES
Filed July 1, 1958 8 Sheets-Sheet 7
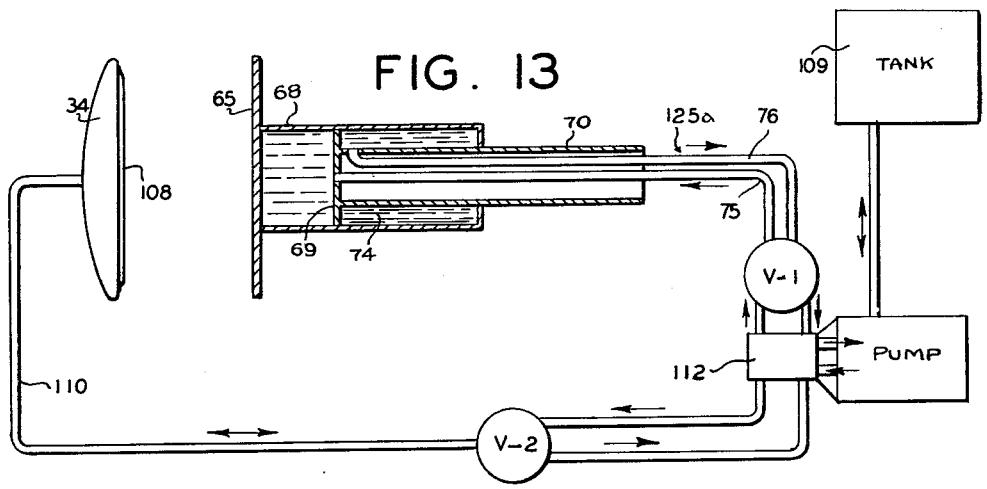
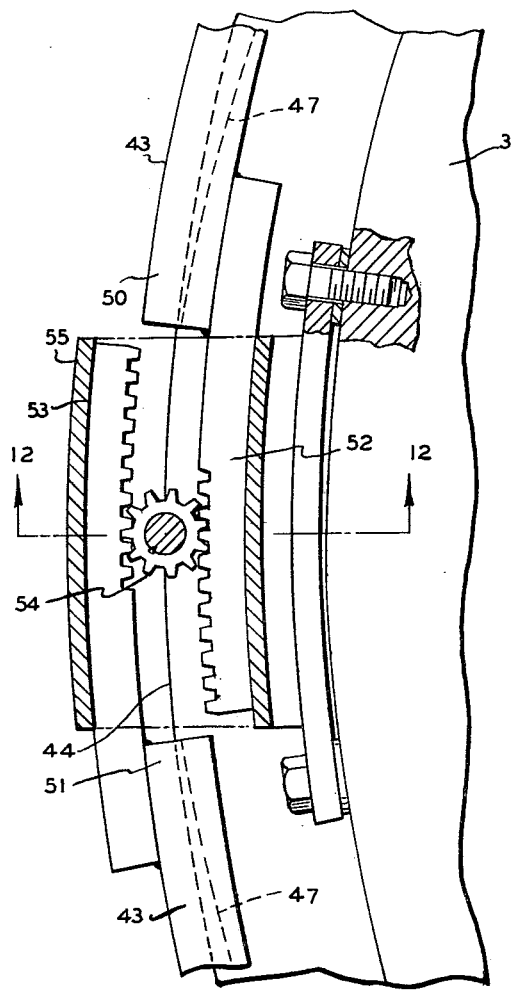
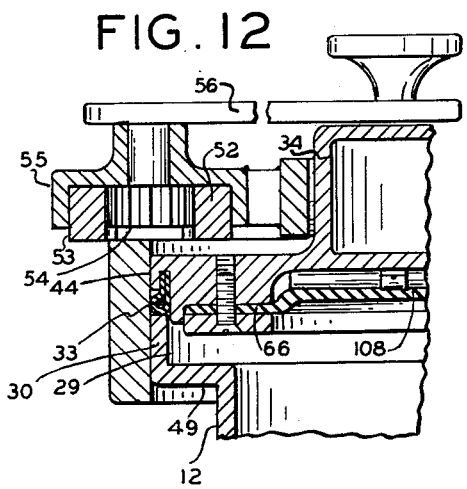
INVENTOR.
JOHN ZIMARIK
BY William Cleland
ATTORNEY Sept. 4, 1962 J. ZIMARIK 3,052,113
APPARATUS FOR WASHING AND WATER-EXTRACTING CLOTHES
Filed July 1, 1958 8 Sheets-Sheet 8
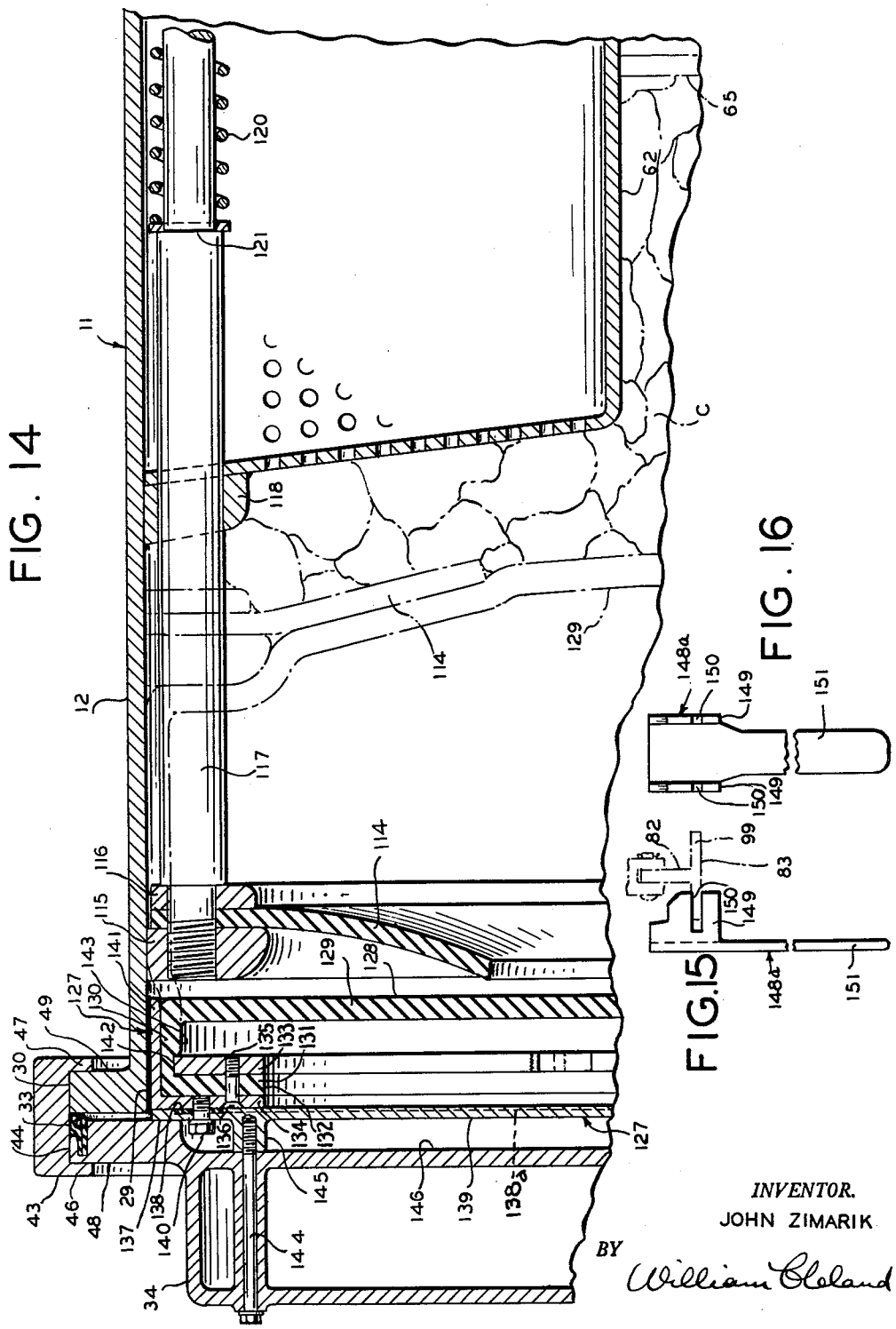
INVENTOR.
JOHN ZIMARIK
BY William Cleland United States Patent Office 3,052,113
Patented Sept. 4, 1962

3,052,113
APPARATUS FOR WASHING AND WATER-EXTRACTING CLOTHES
John Zimarik, Akron, Ohio, assignor to International Laundry Machinery Co., Akron, Ohio, a corporation of Ohio
Filed July 1, 1958, Ser. No. 745,990
17 Claims. (Cl. 68—242)

This invention relates to apparatus for washing and water-extracting clothes.

The subject matter of the present application relates to improvements in such apparatus, particularly as shown and described in U.S. Patent Application Serial No. 291,914, filed June 5, 1952, which issued into U.S. Letters Patent No. 2,823,602 on February 18, 1958. The prior application, broadly stated, covered a process wherein washed articles were tumbled in a cylindrical drum having a closed access opening at one end, while simultaneously urging a plunger axially within said drum toward said end to compact the articles into a confined space of reduced volume, thereby to remove a substantial amount of wash water from the articles. Thereafter, while said batch was held confined by said plunger in a locked position thereof, a fluid-pressurized diaphragm was expanded against the batch further to compact the same under substantially increased pressure to extract additional water therefrom.

One object of the invention is to provide improved locking means for locking said plunger against retraction thereof during the aforesaid additional compacting of the clothes, including a plurality of circumferentially spaced elements adapted to be simultaneously and positively actuated in unison to positions behind said plunger in locked position thereof.

Another object of the invention is to provide a fluid-expandable diaphragm unit, including a plurality of operable parts which are inherently pressure-fluid sealed in the unit, the unit being removably and replaceably attachable to a closure for the aforesaid access opening of the drum, and whereby all or parts of the unit may be replaced or repaired with a minimum of loss of use of the machine.

Another object of the invention is to provide improved power means for reciprocating the plunger, including improved plunger reciprocating means by which maximum stroke of the plunger is attained with a minimum extent of the device exposed outwardly of the drum, and with consequent minimizing of the effective floor area required for use of the machine.

Another object of the invention is to provide, in conjunction with the use of the diaphragm and plunger, improved means for keeping the fluid-extracted articles free of possible pinching engagement thereof between expanded portions of the diaphragm unit and adjacent portions of the drum, which might otherwise result in undue strain on the articles and cause damage thereto.

Another object of the invention is to provide in a machine of the character described, simple, easily operable, and safe means for positively locking the closure on said drum over said access opening of the same.

Other objects of the invention will be manifest from the following brief description and the accompanying drawings.

Of the accompanying drawings:

FIGURE 2 is a view similar to FIGURE 1, but with a closure or door thereof open for loading or unloading clothes.

FIGURE 3 is a vertical cross-section of the washer in clothes-washing condition, partly broken away and in section, taken substantially on the line 3—3 of FIGURE 1.

FIGURE 4 is a cross-sectional view similar to FIGURE 3, illustrating the machine in condition for the final stage of water-extracting clothes by the improved method.

FIGURE 5 is an enlarged fragmentary cross-section, taken substantially on the line 5—5 of FIGURE 3, illustrating a typical portion of a locking mechanism for securing the plunger in fixed position for said final stage of water-extracting the clothes, and wherein locking elements of the mechanism are shown in released condition.

FIGURE 6 is a view corresponding to FIGURE 5, but illustrating the locking elements in locking position.

FIGURE 7 is an enlarged fragmentary cross-section, taken substantially on the line 7—7 of FIGURE 3, and illustrating the manner in which the closure is locked in closed position on the drum.

FIGURE 8 is an enlarged fragmentary cross-section, taken substantially on the line 8—8 of FIGURE 3, and illustrating the manner of sealing relatively fixed and rotatable parts of the drum.

FIGURE 11 is an enlarged fragmentary view, partly broken away and in section, of operating mechanism shown at the left side of FIGURE 1, for actuating the closure locking means referred to in connection with FIGURE 7, the same being illustrated in locked condition.

FIGURE 12 is a fragmentary horizontal cross-section, partly broken away, taken substantially on the line 12—12 of FIGURE 11, and illustrating control means for operating the closure locking mechanism.

FIGURE 13 is a schematic piping diagram, illustrating pertinent portions of fluid-pressure control means for the machine.

FIGURE 14 is a view similar to FIGURE 7, illustrating a modified form of diaphragm unit in the relatively inoperative condition thereof corresponding in part to FIGURE 3, an operative condition corresponding in part to FIGURE 4 being shown in chain-dotted lines.

FIGURE 15 is a side elevation of a tool for manually turning the rotatable drum to operate the plunger locking means of FIGURES 5 and 6.

FIGURE 16 is a front elevation thereof, as viewed from the right of FIGURE 15.

Figure 1:
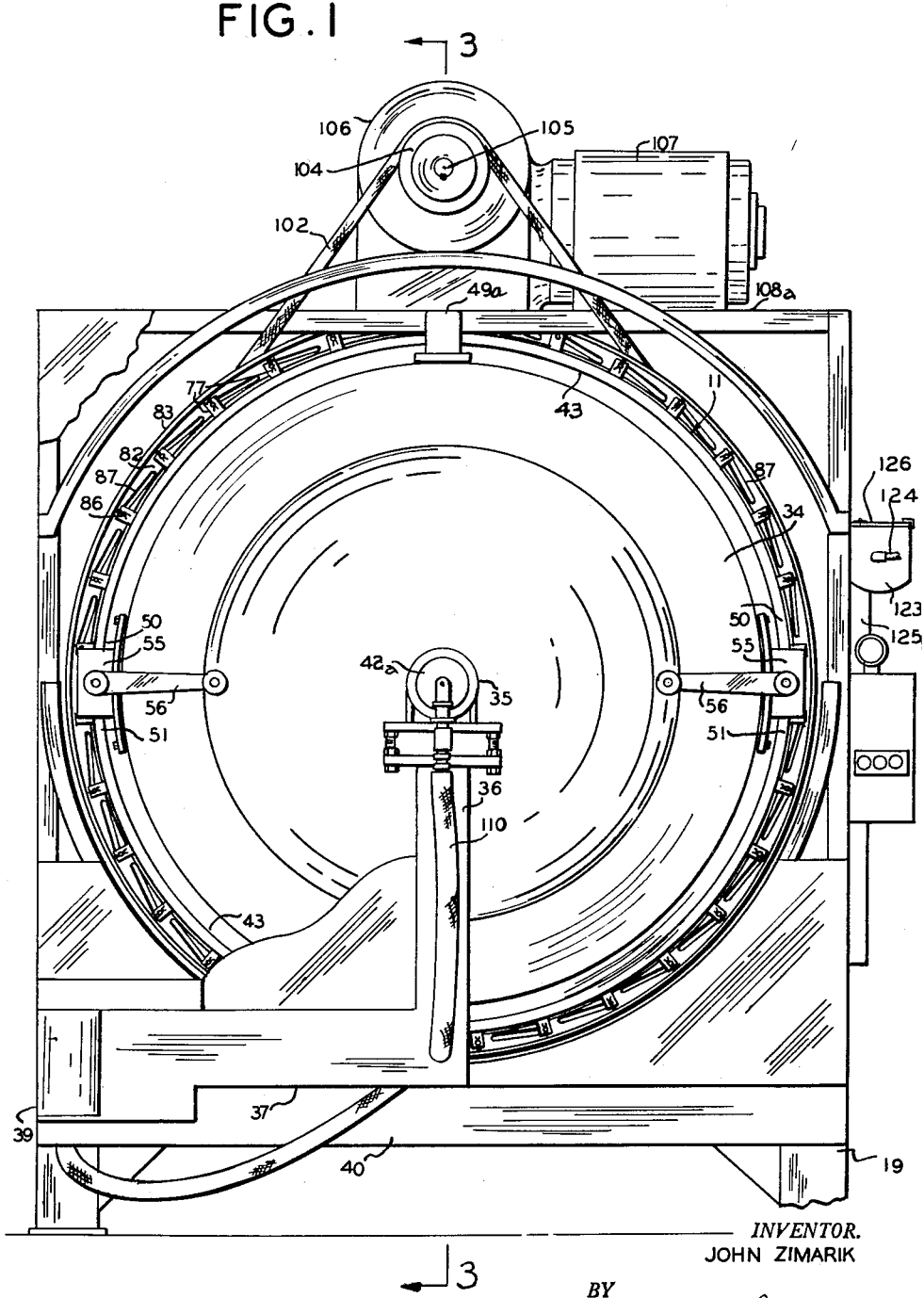
FIGURE 1 is a front elevation, partly broken away of a washing machine embodying the features of the invention, the same being in closed condition.

Referring particularly to FIGURES 1 to 4 of the drawings, there is shown a washing machine incorporating therein the features of the invention, the same including a clothes-containing drum unit 11, having an imperforate cylindrical part 12, which is open substantially to its full diameter at a forward end thereof, the other end of the drum being closed by a relatively fixed part 14 having an inturned cylindrical flange 15, adjacent edges of the flange 15 and drum 12 being fluid-sealed as by suitable device 16 which permits rotation of the drum 12 with reference to the fixed parts 14.

The drum 12 is shown mounted to be rotatable about a horizontal axis, as by means of transversely spaced rollers 17, journalled on fixed bearings 18 on a bedplate 19, and adapted to roll upon an annular track 20 affixed to the outer periphery of the drum adjacent the forward end of the same. In other words, the drum is rotatably supported at its forward end by the rollers 17. For rotatably supporting the rear end of the drum 12, a plurality of peripherally spaced rollers 21, on bearings 22 suitably secured to a fixed upright 23 on bedplate 19, are in rolling engagement with the outer periphery of a cylindrical hub 24, which is attached to the drum to rotate therewith as by means of a plurality of vanes 25, 25. The hub 24 extends through a slip-sealed opening 26 in the wall 27 of fixed drum part 14.

The front opening 29 of the drum part 12 is defined by an offset annular flange 30 (FIGURES 2, 7 and 12), and terminates in a forwardly presented annular edge or seat 32 for fluid sealing engagement by a suitable gasket 33 of a closure 34 for said opening. For independently rotatably mounting closure 34, the same may have a hollow stem 31 journalled in an adjustable bearing 35, on the upper end of a closure support 36 having an angular extension 37 hingedly connected to a hinge bracket 39 which is fixed on the bedplate 19 at one side of the machine, as best shown in FIGURES 1 and 2. Thus, the closure 34 may be swung on the hinge bracket at 39 from the closed position thereof shown in FIGURES 1, 3 and 4 to the fully open position thereof shown in FIGURE 2. The outer end of the hollow stem 31 is fluid-sealed by a cap 42a on bearing 35.

Improved means is provided for positively and safety locking the closure 34 in closed position on the drum 12. Accordingly, as best shown in FIGURES 1, 7, 11 and 12, a pair of radially separable semi-circular locking members 43, 43 are of channel shaped cross-section to engage over and around opposing annular edge portions 44 and 30 of closure 34 and drum 12, respectively. Inturned flanges 46 and 47 of the members 43 thereby engage inwardly against axially oppositely disposed faces 48 and 49 of the edge portions 44 and 30. Locking members 43 may have affixed to adjacent end portions 50 and 51 thereof in each instance, oppositely disposed toothed racks 52 and 53, the tooth portions of which mesh with a pinion 54 at diametrically opposite edges thereof (see FIGURE 11), said pinion being rotatably mounted in a suitable bracket 55 carried by the closure 34. Rotation of the pinion 54 in counter-clockwise direction as viewed in FIGURE 11, as by means of a crank or handle 56, is effective to urge the locking members 43 radially outwardly until the flanges 46 and 47 thereof disengage the flange portions 44 and 30 of the closure member and the drum respectively, whereby the closure member may be swung to open position. Release of the locking members 43 may be facilitated by tapering at least the inner flanges 47 toward the opposite ends 50 and 51 of the respective members 43 (see dotted lines, FIGURE 11). For holding the members 43 in alignment with the edge portion 44, suitable guide brackets 49a, 49a are affixed on the closure centrally of said members.

Referring particularly to FIGURES 3 and 4, water or other fluid from the clothes-containing drum 12 may be quickly discharged outwardly through an outlet valve 57, provided in an outlet conduit 58 on the fixed drum part 14 at the bottom thereof. Valve 57 may be suitably operated as by a fluid-pressure actuated piston cylinder 59, through a suitable linkage 60. By opening the valve 57, while the drum is rotating or stationary, water will be quickly gravitationally discharged from the drum.

Referring further to FIGURES 3 and 4, there is shown provided on the inner periphery of rotatable drum 12 a plurality of circumferentially spaced, axially extending clothes-agitating ribs 62, 62. These ribs are hollow, and the walls thereof are perforated throughout so that water from the drum entering the ribs through the perforations thereof will be freely discharged from open ends 63 at the rear of the drum.

A perforated water-extracting plunger 65 may be relatively non-rotatably mounted to be axially reciprocable within drum 12 from a position at the rear thereof as shown in FIGURE 3, to a given position in relatively closely spaced parallelism to the inner face 66 of the closure 34, as shown in FIGURE 4. Locking means 67 may be provided for locking the plunger 65 in said given position, in which the face of plunger 65 is adapted to define a clothes-confining space of relatively small volume, as compared with the total clothes-containing volume of the drum between closure 34 and the plunger 65 in the relative positions thereof shown in FIGURE 3.

For axially shifting the plunger 65 as described, the same may be mounted on the inner end of a fluid-containing cylinder 68, which is axially shiftably received through the sleeve 24 carried by the rotatable drum part 12. Reciprocally received within the cylinder 68 may be a piston 69 from which extends rearwardly a piston rod 70, which is fixedly and non-rotatably supported at its rearward end on a fixed bracket 72 supported by the fixed upright 23. The outer end of cylinder 68 is suitably fluid-sealed at 73 with reference to the piston sleeve 70, thereby defining with the piston 69 an annular fluid-containing space 74. Pressure fluid, such as water, supplied through a conduit 75 to the portion of the cylinder forwardly of the piston 69 is effective to force the plunger 65 forwardly, from the position thereof shown in FIGURE 3 to the relative position shown in FIGURE 4, or forwardly thereof. Conversely, release of fluid pressure forwardly of the piston 69 and application of pressure fluid through conduit 76 to the annular space 74 is effective to urge plunger 65 back to the full-line position thereof shown in FIGURE 3. Plunger 65 extends to substantially the full diameter of the drum part 11 and has cut-outs in the edge portions thereof complementally receiving the agitator ribs 62, thereby providing guide means which permit axial shifting of the plunger without rotation thereof relatively of the drum.

The locking means 67, as best shown in FIGURES 3, 4, 5, 6, 9 and 10, may include a plurality of circumferentially spaced locking pins 77, axially shiftably received through bushings 78 in the drum 12 and a reinforcing rib 79 secured thereto, these locking pins normally being retained in retracted positions in which inner ends thereof are flush with the inner periphery of the drum, as best shown in FIGURE 5. The outer ends of the locking pins 77 may be slotted at 80 for sliding reception of an inturned annular flange 82 of a T-shaped ring 83, the inner edge of the flange 82 being in rolling engagement with a plurality of circumferentially spaced rollers 84, 84 on brackets 85 secured to the rib 79 of the drum. Guide pins 86 received through the slotted inner ends of the locking pins 77 also extend through elongated cam slots 87, 87 provided in the flange 82, each to extend at a suitable angle to a line tangent to the outer periphery of the drum 11, taken at a point aligned with axis of the respective locking pin, for example. By rotating the T-ring 83 relative to the drum, in clockwise direction as viewed in FIGURE 5, the guide pin 86 will be guided radially inwardly in cam slots 87 to move the locking pins 77 to the inwardly projecting positions thereof shown in FIGURES 4 and 6, thereby to be engageable behind the plunger 65 to prevent retraction thereof, as shown in FIGURE 4 and for purposes to be described later.

Figure 9:
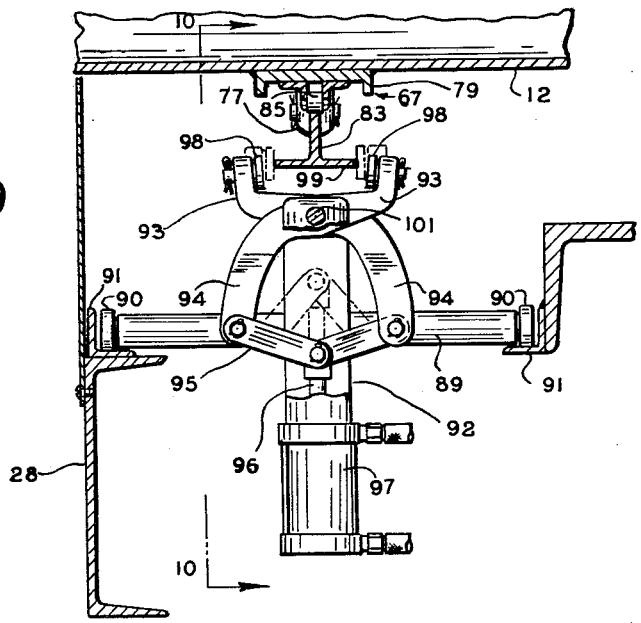
FIGURE 9 is an enlarged fragmentary cross-section, taken substantially on the line 9—9 of FIGURE 2, and illustrating power-operated means for actuating said locking mechanism shown in FIGURES 5 and 6.
Figure 10:
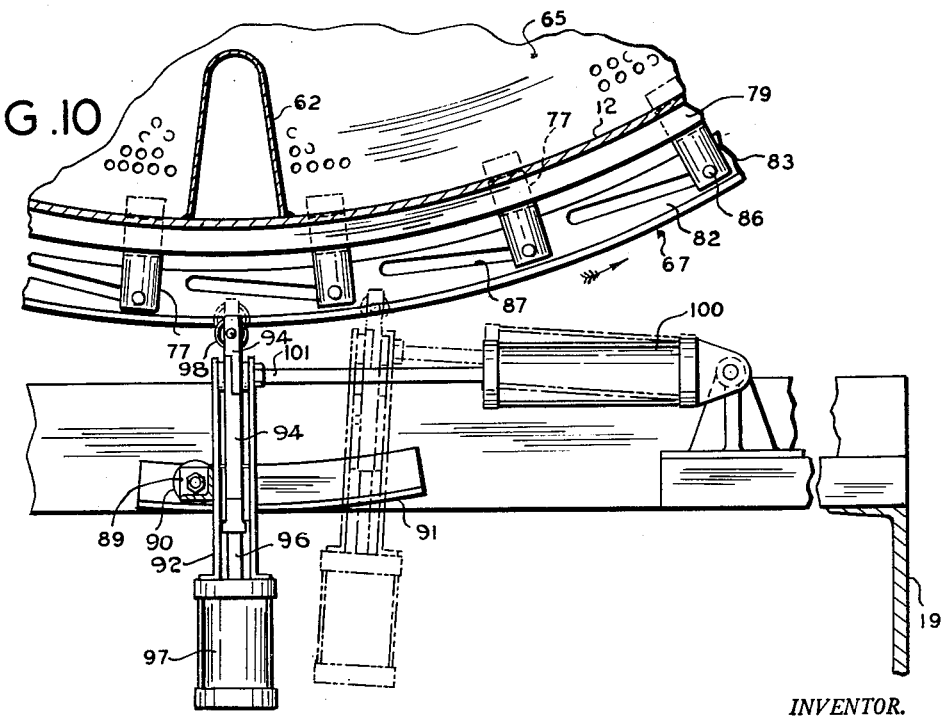
FIGURE 10 is a fragmentary cross-section, taken substantially on the line 10—10 of FIGURE 9, and illustrating the operating means in conjunction with said plunger locking mechanism.

Means for rotating the T-ring 83 with reference to drum 12 is illustrated in FIGURES 9 and 10. This means may include a cross-bar 89 having rollers 90 at opposite ends thereof for rolling engagement on spaced tracks 91, 91 which are suitably mounted on the bedplate 19. Cross-bar 89 carries a bracket 92 on which are a pair of pivot jaws 93, 93, extensions 94 of which are connected by a toggle 95 to a piston rod 96 of a fluid-pressure operated piston cylinder 97, carried by bracket 92. The jaws 93 have thereon inwardly oppositely disposed clamping shoes 98, for engagement with opposite edges of the outer web 99 of the T-ring 83, upon actuation of the toggle 95 by the piston cylinder 97. Upon so clamping the edges of the web 99, as shown in chain-dotted lines of FIGURE 9, a piston cylinder 100 pivoted to another fixed portion of the bedplate, is operable to move a piston rod 101, connected to the upper end of bracket 92, thereby to move the bracket 92 and associated parts carried thereby from the chain-dotted line position to the full line position, as shown in FIGURE 10, whereby the T-ring is moved in counter-clockwise direction to urge the locking pins inwardly as previously described.

In operation of the plunger-locking mechanism 67, as previously described in connection with FIGURES 9 and 10, the T-ring 83 may be manually turned with respect to the drum 12 to move the locking pins 77, in which case the clamping jaws 93 and associated operating parts may be omitted. Accordingly, a hand tool 148, shown in FIGURES 15 and 16, may be provided with laterally spaced out-turned jaws 149, 149 having aligned slots 150 therein for reception of one edge of web 99 of the ring 83. Thus, by manipulating an elongated handle 151 of the wrench as a lever, a wedging grip is first applied to the web 99 and then the ring 83 is turned to move pivot pins 86 in the cam slots 87, thereby to move the locking pins 77, as from the retracted positions thereof shown in FIGURE 5 to the extended stop positions shown in FIGURE 6.

Drum 12 may be rotated at desired washing and tumbling speeds, as by means of a plurality of rubber V-belts 102, 102 frictionally engaged around a correspondingly grooved annular band 103, welded onto the drum, and around a grooved pulley 104 which is keyed on a horizontal shaft 105, extending from a reducing gear housing 106 of an electric motor unit 107 mounted on top of an upper extension 108a of the framework on bedplate 19. Motor unit 107 is of the reversing type operable in known manner to reverse the direction of rotation of the drum during clothes washing, rinsing or tumbling operations.

It will be manifest that the water-extracting pressure applicable to clothes C within drum 12 by means of the plunger 65, at the forward end of the drum in the relative position of the plunger shown in chain-dotted lines of FIGURE 3, is limited to the size of the pressure effective area of the piston 69 forwardly thereof and to the fluid pressure supplied to the conduit 75. In other words, in order to utilize the pressure of plunger 65 to squeeze out as much as 60% of the wash water from clothes C in the drum, the cylinder 68 would necessarily be so large and cumbersome as to be commercially impractical. In the present instance the plunger 65, after use for a preliminary squeezing of the clothes, is held fixed against rearward retraction by the locking means 67, as previously described and as best shown in FIGURE 4, and the clothes thus confined in substantially reduced space are subjected to further, much heavier pressure of a fluid-expandable diaphragm 108 mounted on the inner face or wall 66 of the closure 34.

Diaphragm 108 may be of fabric-reinforced, vulcanized rubber, molded to have an inwardly presented substantially flat disc-like area, approximating the transverse area, sometimes referred to as the flow area, of the clothes-containing portion of the drum (FIGURE 3). The peripheral edge portions of the diaphragm are suitably secured in fluid-sealed relation against the solid backing of closure wall 66. Water from a storage tank 109 (see FIGURES 4 and 13) is pressurized by a pump 112 and admitted to the interior of the diaphragm 108, through a conduit 110 connected to bearing cap 42a and through the hollow extension 42 of the closure 34. Thus pressurized water may be supplied to expand the diaphragm while the drum is rotated or stationary. Water pressure at 175 or 200 lbs. per sq. in. for example, may be maintained in the diaphragm by means of a pressure pump 112.

Referring to FIGURES 2, 3 and 4 (see FIGURE 14 also), means is provided to prevent the wet clothes C from being pinched by expanded peripheral edge portions 113 of the diaphragm and adjacent portions of the drum 12, in the relative condition shown in FIGURE 4. To this end, an annular flapper 114 of flexible elastic material, such as rubber or reinforced rubber-like material, is secured to an annular ring 115 of suitable metal, as by means of an annular clamping ring 116, the ring 115 having the outside diameter thereof slightly less than the inside diameter of the drum 12 to be axially slidable therein. The ring 115 is affixed to the outer ends of a plurality of peripherally spaced metal rods 117, each of which is axially shiftably mounted on spaced guide blocks 118 and 119, affixed to the inner periphery of the drum. A compression spring 120 is provided between each inner block 119 and a shoulder 121 on the corresponding rod 117, tending to urge the rod 117 outwardly of the drum toward stop engagement of a collar 122 on the inner end of the rod with the fixed block 119. As best shown in FIGURE 4, when the diaphragm 108 is in inwardly expanded condition, the radially inwardly extending flapper 114 will be urged inwardly against adjacent portions of the clothes C so that no such portions will be compressed between outer peripheral portions of the expanded diaphragm and the drum. As will be best understood later, there will be no pinching of the clothes which might otherwise cause damage by tearing thereof, as when the plunger 65 is urged rearwardly of the drum to release the pressure on the clothes, and subsequent tumbling of the clothes will not be restrained by aforementioned pinching action before the diaphragm is deflated. Upon release of the pressure within the diaphragm and rearward retraction of plunger 65 for further operations on the clothes C, the flapper ring 114 will be urged forwardly by the spring 120.

Referring to FIGURE 13, there is illustrated a schematic piping diagram of means for controlling the supply of pressurized water for operating cylinder 68 and diaphragm 108. For this purpose, pump 112 circulates water at a predetermined pressure to valves V-1 and V-2, which are normally set in neutral. Valve V-1 is manually operable to supply pressurized water through conduit 75 to the forward side of piston 69, as previously described, the pressure fluid behind the piston being returned through conduit 76, as indicated by arrows at 125a. In this way, the plunger 65 is moved toward the previously described locked position. While the plunger 65 is held in locked position, as best shown in FIGURE 4, the valve V-1 is set in neutral, thereby relieving water pressure in the cylinder, after which valve V-2 is manually operable to supply pressurized water to diaphragm 108 (see arrows), thereby expanding the diaphragm to apply the aforementioned additional pressure to clothes C contained in the drum 12, against the backing of locked plunger 65.

The operation of the improved machine is as follows.

In preparation for a cycle of washing and water-extracting operations on a batch of soiled clothes C, for example, the drum part 12 initially will be in non-rotating condition, the plunger 65 will be retracted rearwardly, and the closure 34 will have been swung to one side, as shown in FIGURE 2. After placing the batch of soiled clothes in the drum, the closure 34 is swung forwardly to the fluid-sealed, closed position of FIGURES 1 and 3. Now the operator may, by turning the cranks 56, and through pinions 54 and the respective racks 52 and 53, urge the semi-circular locking members radially inwardly of each other, toward positive locking embracement around the edge portions 30 and 44 of closure 34 and drum 12, respectively, as shown in FIGURES 3, 4, 7 and 11.

In this condition of the machine, with valve means 57 held closed, fresh water from a supply pipe 124 may be run into the drum 12 through an access box 123, connected by a conduit 125 (see FIGURES 1 and 2) communicating with the interior of drum part 12 through the fixed drum part 14. Soap is supplied in the same way through a lid 126 in said access box. Next, the closed drum part 12 is rotated by operation of the motor 107 for predetermined lengths of time in reversing directions.

Now, the operator after opening valve 57 and while continuing rotation of the drum, to remove all flowable water from the same, operates valve V-1 as previously described, to move the plunger 65 somewhat forwardly of the position thereof shown in FIGURE 4. In this condition of the perforated plunger 65, the clothes C will be uniformly "pancaked" against the deflated diaphragm 108, and thereby to extract a substantial amount of the wash water from the clothes and empty it through conduit 58. Now rotation of drum part 12 is stopped and locking means 67 of FIGURES 5, 6, 9 and 10 is actuated simultaneously to project the locking pins 77 behind plunger 65, positively to lock the same against rearward retraction upon subsequent operation of valve V-1 to neutral position, and operation of valve V-2 to expand the diaphragm 108 (see FIGURE 4). Very heavy internal pressure of the diaphragm is thus applied uniformly to the pancaked clothes over a wide area approximating the clothes-containing flow area of the drum part 12, against the solid backing of plunger 65. In this way the initial forward operation of the plunger is effective to squeeze out most of the water from the clothes, after which expansion of the diaphragm removes substantially all of the water remaining in the clothes. This substantially eliminates carry-over of dirty water from the above described washing operation to a subsequent rinsing operation, for example.

An aforementioned rinsing operation may be accomplished in the condition of the machine shown in FIGURE 3, by closing valve means 57, and running clear rinsing water into the still roatating drum, after unlocking the locking means 67 and operating the plunger 65 to its rearward position of FIGURE 3. After a sufficient rinsing period the valve 57 is again opened and plunger 65 and diaphragm 108 are operated as before to extract the rinsing water. This rinsing and extracting operation may be repeated, although in some instances only one rinsing may be necessary.

In any event, after the final rinsing and water-extracting operation, as described, the unlocked plunger 65 is operated rearwardly with continued rotation of the drum, thereby to cause the pancake of resultantly substantially dry clothes C to fall away and to be individually agitated by the ribs 62 to very desirable fluffy condition.

After the clothes have been sufficiently dried and fluffed as described, rotation of the drum 12 is stopped so that the closure 34 may be opened and swung to one side to leave the drum access opening forwardly free and unobstructed, whereupon the plunger 65 may be operated forwardly while the drum is again rotated, thereby to urge the dry, fluffy clothes into a suitable container or dolly (not shown) placed under said opening for that purpose.

By washing and water-extracting method described above, it has been found that a thirty-two pound batch of dry clothes C, which weighs approximately 96 pounds in saturated condition, will weigh only about forty-nine pounds or less upon being ejected from the machine, in which condition substantially all of the water is removed. In other words, the treated clothes are sufficiently dry to be taken immediately for ironing or steam pressing operations. The operator is never at any time required to handle or tug staturated clothes, and handles them manually only once, that is, in placing the soiled, dry clothes in the machine, the treated clothes being ejected from the machine by plunger 65. In contrast with the excessive handling of the clothes required by prior art methods, the present machine is economical in many ways, but particularly in eliminating the necessity for use of expensive separate extractors, and in cutting down on the labor usually required to operate a multiple machine system and to move the articles from one machine to the other. The fluffed up clothes C fall easily from the drum compartment without manual assistance, whereas in the prior art washing machines, the wet clothes being in tangled, twisted condition were often required to be removed piece-by-piece and damage by tearing was not uncommon.

Referring particularly to FIGURE 14, there is illustrated a modified form of the invention, with particular reference to a diaphragm corresponding to diaphragm 108 of FIGURES 3 and 4. In this form of the invention, the diaphragm is included as a self-contained unit 127 adapted to be readily removable from the machine and to be interchangeable with like units, as for maintenance or repairs.

Accordingly, the unit 127 may include a diaghragm 128 of elastic material, such as natural or synthetic rubber, formed as in a mold to have a disc-like inner wall portion 129 of substantially broad lateral area approximating that of the clothes-containing portion of drum 11, and an integral peripheral or annular portion 130, terminating in an inturned narrow annular flange 131 defining a relatively large diaphragm opening 132. The flange 131 may be clamped between inner and outer annular elements 133 and 134, respectively, of rigid material, as by means of a plurality of circumferentially spaced screws 135 extended through the elements and through said flange. A head 136 of each screw 135 may be countersunk, to be flush with the outer face of the element 134, so that said outer face constitutes a flat seat for complemental fluid-sealing engagement with a flat seat 138 of a disc-shaped backing plate 139. The backing plate may be secured, as a part of the integrated unit, by means of a plurality of circumferentially spaced screws 140 received through the plate 139 and the outer element 134.

For preventing leakage of pressure fluid from the diaphragm, through possible spaces between the diaphragm and the inner element 133, the latter may have an angular flange 141 extending axially inwardly of drum 11, in closely spaced relation to the inner periphery of the drum, and encompassing said peripheral edge portion 130 of the diaphragm, the inner element 133 being extended radially outwardly of the drum to a sufficient extent to have an outer peripheral edge portion 142 thereof of greater diameter than the inner peripheral surface 143 of the diaphragm in its normal molded shape, thereby to compress the elastic material of the peripheral portion to substantial extent against the solid backing of the flange 141. Thus, if the outer peripheral portion 130 of the diaphragm is normally in contact with the inner periphery of flange 141, the element extension 142 will maintain the peripheral edge of the diaphragm under relatively high compressive stress, completely around the diaphragm, and will thereby eliminate any possibilty of leakage of pressure fluid between the rubber to metal surfaces of the diaphragm. It has been found that an improved fluid seal is provided if the ring 133 is strongly welded or bonded to the rubber of the diaphragm. A tight fluid seal may be made between the element 134 and seat 138, by provision of a rubber or like gasket 138a therebetween.

The diaphragm unit 127 may be removably secured as such to the closure member 34, as by means of elongated screws 144 extended through the closure member and threaded into spacer bosses 145 which are integral with the outer face of backing plate 139, said bosses being in stop engagement with the inner face 146 of the closure member. When it becomes necessary to repair or replace the diaphragm 128, the entire unit 127 may be removed from the closure member 34 by removing the screws 144 and installing a new or reconditioned unit 127. In this way, repairs or replacements may be made without keeping the washing and extracting machine in non-operating condition.

In operation of the diaphragm unit 127 in the washer, pressurized fluid is supplied as previously described through a known type of releasable slip-seal connection (not shown) between hollow stem 31 and the backing plate 139 to the fluid-sealed chamber defined between said plate 139 and the diaphragm 128, thereby to expand the inner wall 129 of the diaphragm against clothes confined between the same and the plunger 65 in the previously described locked condition thereof, and substantially in the manner shown in FIGURE 4 and as otherwise illustrated in chain-dotted lines in FIGURE 14. Like parts, therefore, are designated by like numerals unless otherwise indicated.

Other modifications of the invention may be resorted to without departing from the spirit thereof or the scope of the appended claims.

What is claimed is:

1. A machine for fluid-extracting clothes or like articles, comprising an imperforate article containing drum rotatable about an axis thereof, a plunger axially shiftable in the drum, means for axially shifting said plunger from a retracted position toward a given position at one end of the drum to compress articles in a confined space of substantially reduced volume at said one end, a plurality of peripherally spaced locking elements mounted on said drum to be shiftable radially of the axis of the drum toward and from a position of engagement behind a portion of said plunger to lock the same against retraction from said given position, and peripherally extending cam means mounted on said drum to rotate therewith, said cam means including selectively relatively movable cam parts carried by the drum and relatively movable peripherally thereof to shift said elements radially toward and from said position of locking engagement.

2. A machine for fluid-extracting clothes or like articles, comprising an article containing drum rotatable about an axis thereof, a plunger axially shiftable in the drum, means for axially shifting said plunger from a retracted position toward a fixed position at one end of the drum to compress articles in a confined space of substantially reduced volume at said one end, a plurality of peripherally spaced locking elements mounted on said drum to be radially shiftable toward and from positions of locking engagement behind portions of said plunger to lock the same against retraction from said fixed position, an annulus selectively relatively rotatably mounted on said drum to rotate therewith, and actuating means on said annulus operable upon rotation of the annulus relatively of the drum to shift said elements in unison toward and from said locking positions thereof.

3. A machine for fluid-extracting clothes or like articles, comprising an article containing drum rotatable about an axis thereof, a plunger axially shiftable in the drum, means for axially shifting said plunger from a retracted position toward a fixed position at one end of the drum to compress articles in a confined space substantially reduced volume at said one end, a plurality of peripherally spaced locking elements mounted on said drum to be radially shiftable toward and from positions of locking engagement behind portions of said plunger to lock the same against retraction from said fixed position, an annulus selectively relatively rotatably mounted on said drum to rotate therewith, and actuating means on said annulus operable upon relative rotation of the annulus relatively of the drum to shift said elements in unison toward and from said locking positions thereof, said actuating means including pin-in-slot connections between said elements and said annulus.

4. A machine for fluid-extracting clothes or like articles, comprising an article containing drum rotatable about an axis thereof, a plunger axially shiftable in the drum, means for axially shifting said plunger from a retracted position toward a fixed position at one end of the drum to compress articles in a confined space of substantially reduced volume at said one end, a plurality of peripherally spaced locking elements mounted on said drum to be radially shiftable toward and from positions of locking engagement behind portions of said plunger to lock the same against retraction from said fixed position, an annulus selectively relatively rotatably mounted on said drum to rotate therewith, and actuating means on said annulus operable upon rotation of the annulus relatively of the drum to shift said elements in unison toward and from said locking positions thereof, releasable gripping means being provided for relatively rotating said annulus relatively of said drum to shift said elements.

5. A machine for fluid-extracting clothes or like articles, comprising an article containing drum rotatable about an axis thereof, a plunger axially shiftable in the drum, means for axially shifting said plunger from a retracted position toward a fixed position at one end of the drum to compress articles in a confined space of substantially reduced volume at said one end, a plurality of peripherally spaced locking elements mounted on said drum to be radially shiftable toward and from positions of locking engagement behind portions of said plunger to lock the same against retraction from said fixed position, an annulus selectively relatively rotatably mounted on said drum to rotate therewith, and actuating means on said annulus operable upon rotation of the annulus relatively of the drum to shift said elements in unison toward and from said locking positions thereof, gripping means being provided for releasably gripping and moving said annulus to rotate the same relatively of said drum, and thereby to provide said radial shifting of the elements.

6. A machine for fluid-extracting clothes or like articles, comprising an article containing drum rotatable about an axis thereof, a plunger axially shiftable in the drum, means for axially shifting said plunger from a retracted position toward a fixed position at one end of the drum to compress articles in a confined space of substantially reduced volume at said one end, a plurality of peripherally spaced locking elements mounted on said drum to be radially shiftable toward and from positions of locking engagement behind portions of said plunger to lock the same against retraction from said fixed position, an annulus selectively relatively rotatably mounted on said drum to rotate therewith, and actuating means on said annulus operable upon rotation of the annulus relatively of the drum to shift said elements in unison toward and from said locking positions thereof, a fluid-expandable wall being mounted to be backed and supported at said one end of the drum and adapted to be fluid expanded against the confined articles while said plunger is locked in said given position thereof.

7. A machine for fluid extracting clothes or like articles comprising an article containing drum provided with an access opening of substantial transverse area at one end axially thereof approximating substantially the transverse area of the drum, a closure member removably attached to said drum over said opening, a plunger axially shiftable in the drum, power means for axially shifting said plunger toward a given position at said one end of the drum to compress articles in a confined space of substantially reduced volume at said one end, a fluid containing member mounted to be at said one end of the drum when said plunger is in said given position and having a fluid expandible wall portion of board lateral area approximating said transverse area, means for applying fluid pressure within said member to expand said wall portion against said articles in said confined space, further to compress the articles into a substantially solid disc-like body in said given position of the plunger, and flexible separator means being provided on the inner periphery of said drum adjacent said access opening to extend radially inwardly of the drum, said separator means thereby being engageable between corresponding outer marginal portions of said expanded wall portion and outer marginal portions of said body compressed thereby, whereby is prevented pinching of the confined articles between said expanded wall portion and adjacent portions of the drum, said separator means being relatively narrow and thereby adapted to be flexed by outward passage of articles through the access opening.

8. A machine as set forth in claim 7, wherein said separator means includes an annulus of relatively thin flexible material.

9. A machine as set forth in claim 8, wherein said annulus is mounted to be yieldingly flexed axially of said drum.

10. A machine as set forth in claim 9, wherein said annulus is of rubber-like elastic material.

11. A machine for fluid-extracting clothes or like articles comprising an article containing drum having an open end, a closure releasably mounted on said drum for opening and closing said open end, a plunger axially shiftable in the drum, means for axially shifting said plunger from a retracted position toward a fixed position at said open end of the drum to compress the articles in a confined space of substantially reduced volume between said closure and plunger, a diaphragm unit removably mounted on said closure, said diaphragm unit including a rigid backing member and a diaphragm of elastic material, said diaphragm having fluid-expandable wall portions of broad lateral area and a peripheral portion defining a diaphragm opening, means being provided for securing said backing member in fluid-sealing relation to said peripheral portion to close said diaphragm opening and define within the diaphragm a pressure-fluid containing chamber, means on said backing member and said closure for removably mounting said diaphragm unit to be backed and supported on the closure with said diaphragm wall portion presented toward said plunger, and means for supplying fluid under pressure to said chamber to expand said wall portion against the backing of said member and closure, thereby further to compress the confined articles.

12. A machine as set forth in claim 11, said means for securing said backing member including a substantially rigid annular element affixed to said peripheral portion in pressure-fluid sealing relation, means being provided for maintaining said annular element and said backing member in the pressure-fluid sealing relationship.

13. A machine as set forth in claim 12, said rigid annular element having an integral annular flange embracing said peripheral portion of the diaphragm.

14. A diaphragm unit as for apparatus of the character described having a diaphragm supporting wall, comprising a rigid backing member having thereon an inwardly presented annular seat, a diaphragm of elastic material including a fluid-expandable wall portion of broad lateral area and a peripheral portion defining an outwardly presented diaphragm opening, a rigid annular element affixed in fluid pressure sealed relation to said peripheral portion and providing thereon an outwardly presented annular seat in fluid-sealing relationship to said annular seat of the backing member, peripherally extending means for securing said backing member in said fluid-sealing relationship to said outwardly presented seat of said rigid annular element and thereby to define a pressure-fluid containing chamber within said diaphragm, means for supplying fluid under pressure to said chamber, and means on the outer side of said backing member for removably affixing said diaphragm unit backed and supported on the diaphragm supporting wall.

15. A diaphragm unit as set forth in claim 14, said means for securing said backing member including a substantially rigid annular element affixed to said peripheral portion in pressure-fluid sealing relation, said annular element and said backing member having complemental seat portions in said fluid sealing relationship thereof.

16. A machine for fluid-extracting clothes or like articles, comprising a fixed rear support, an imperforate article-containing drum, rotatably mounted on said rear support and having a forward access opening, a plunger axially shiftable in the drum, a relatively fixed front support having a part movable toward and from said access opening, a closure rotatably mounted on said movable support part to be movable therewith from and toward fluid sealing relationship with said drum over said access opening, said drum and closure having mating out-turned annular flange portions, a plurality of segmental arcuate channels embracing said mating flange portions to clamp the same together, means operable to expand said arcuate channels radially outwardly to permit opening and closing said closure, means for axially shifting said plunger from a retracted position toward a fixed position at the access opening end of the drum to compress articles in a confined space of substantially reduced volume at said one end, against the backing of said clamped closure, means operable for locking said plunger against retraction from said given position, a fluid-expandable wall being mounted to be backed and supported at said one end of the drum and adapted to be fluid expanded against the confined articles while said plunger is locked in said given position thereof.

17. A machine for fluid-extracting clothes or like articles, comprising a relatively fixed support, an imperforate article-containing drum rotatable on said support, a closure at a forward end of the drum, a plunger axially shiftable in the drum, bearing means on said support adjacent the rearward end of the drum, a hollow fluid-containing cylinder having a forward end axially affixed on said plunger within the drum and rotatably received in said bearing means so as to be axially shiftable therein to move the plunger, piston means having a piston within said cylinder dividing the same into forward and rear compartments, said piston being positioned within said drum and being fixedly mounted with respect to said support, means for selectively supplying pressure-fluid to one or other of said forward and rear chambers at opposite sides of said piston, thereby to urge said plunger and cylinder toward and from an extended position at the forward end of the drum to compress articles in a confined space of substantially reduced volume at said forward end, means on said drum selectively operable for locking said plunger in a fixed position to prevent retraction of the same from said extended position, a fluid-containing member mounted on said closure presenting a fluid-containing diaphragm inwardly of the drum, and means for applying fluid-pressure in said fluid-containing member to expand said diaphragm toward said fixed plunger.

References Cited in the file of this patent

UNITED STATES PATENTS

| | | |
|---|---|---|
| Re. 24,257 | Kahn | Dec. 18, 1956 |
| 666,170 | Webster | Jan. 15, 1901 |
| 1,993,201 | Yandell | Mar. 5, 1935 |
| 2,075,968 | Von Heydekampf | Apr. 6, 1937 |
| 2,501,460 | Watson | Mar. 21, 1950 |
| 2,823,602 | Zimarik et al. | Feb. 18, 1958 |

FOREIGN PATENTS

| | | |
|---|---|---|
| 657,700 | Great Britain | Sept. 26, 1951 |
| 705,736 | Great Britain | Mar. 17, 1954 |